United States Patent
Guim Bernat et al.

(10) Patent No.: US 11,138,101 B2
(45) Date of Patent: *Oct. 5, 2021

(54) NON-UNIFORM MEMORY ACCESS LATENCY ADAPTATIONS TO ACHIEVE BANDWIDTH QUALITY OF SERVICE

(71) Applicant: Intel Corporation, Santa Clara, CA (US)

(72) Inventors: Francesc Guim Bernat, Barcelona (ES); Karthik Kumar, Chandler, AZ (US); Thomas Willhalm, Sandhausen (DE); Raj K. Ramanujan, Federal Way, WA (US); Brian J. Slechta, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 126 days.

This patent is subject to a terminal disclaimer.

(21) Appl. No.: 16/204,772

(22) Filed: Nov. 29, 2018

(65) Prior Publication Data

US 2019/0171556 A1 Jun. 6, 2019

Related U.S. Application Data

(63) Continuation of application No. 14/998,085, filed on Dec. 24, 2015, now Pat. No. 10,146,681.

(51) Int. Cl.
*G06F 12/00* (2006.01)
*G06F 12/02* (2006.01)
*G06F 12/0893* (2016.01)

(52) U.S. Cl.
CPC .......... *G06F 12/02* (2013.01); *G06F 12/0893* (2013.01); *G06F 2212/1024* (2013.01);
(Continued)

(58) Field of Classification Search
None
See application file for complete search history.

(56) References Cited

U.S. PATENT DOCUMENTS 7,539,143 B2 5/2009 Moores et al.
2001/0037445 A1 11/2001 Mukherjee
(Continued)

FOREIGN PATENT DOCUMENTS

CN 1488104 A 4/2004
CN 101403958 A 4/2009
(Continued)

OTHER PUBLICATIONS

International Search Report and Written Opinion for International Patent Application No. PCT/US2016/063546, dated Mar. 9, 2017, 9 pages.

(Continued)

*Primary Examiner* — Craig S Goldschmidt
(74) *Attorney, Agent, or Firm* — Jordan IP Law, LLC

(57) ABSTRACT

Systems, apparatuses and methods may provide for detecting an issued request in a queue that is shared by a plurality of domains in a memory architecture, wherein the plurality of domains are associated with non-uniform access latencies. Additionally, a destination domain associated with the issued request may be determined. Moreover, a first set of additional requests may be prevented from being issued to the queue if the issued request satisfies an overrepresentation condition with respect to the destination domain and the first set of additional requests are associated with the destination domain. In one example, a second set of additional requests are permitted to be issued to the queue while the first set of additional requests are prevented from being issued to the
(Continued)

queue, wherein the second set of additional requests are associated with one or more remaining domains in the plurality of domains.

22 Claims, 3 Drawing Sheets

(52) U.S. Cl.
CPC ......... *G06F 2212/2542* (2013.01); *G06F 2212/603* (2013.01); *G06F 2212/6042* (2013.01)

(56) References Cited

U.S. PATENT DOCUMENTS

| | | | |
|---|---|---|---|
| 2006/0098672 A1* | 5/2006 | Schzukin | H04L 47/20 370/412 |
| 2006/0236080 A1* | 10/2006 | Doing | G06F 9/3804 712/238 |
| 2006/0271725 A1 | 11/2006 | Wong | |
| 2007/0039002 A1 | 2/2007 | McDonald | |
| 2008/0229308 A1 | 9/2008 | Wyman | |
| 2008/0256306 A1 | 10/2008 | Warner et al. | |
| 2012/0198187 A1 | 8/2012 | Accapadi et al. | |
| 2012/0317364 A1 | 12/2012 | Loh | |
| 2013/0117521 A1 | 5/2013 | Li et al. | |
| 2014/0095748 A1 | 4/2014 | Aingaran et al. | |
| 2014/0095796 A1* | 4/2014 | Bell, Jr. | G06F 12/084 711/130 |

FOREIGN PATENT DOCUMENTS

| | | |
|---|---|---|
| CN | 101960418 A | 1/2011 |
| CN | 102197382 A | 9/2011 |
| CN | 103370699 A | 10/2013 |
| CN | 103513957 A | 1/2014 |
| CN | 103827881 A | 5/2014 |
| CN | 104035823 A | 9/2014 |
| WO | 2007123542 A1 | 11/2007 |
| WO | 2014163620 A1 | 10/2014 |

OTHER PUBLICATIONS

International Preliminary Report on Patentability for International Patent Application No. PCT/US2016/063546, dated Jul. 5, 2018, 6 pages.

Non-Final Office Action for U.S. Appl. No. 14/998,085, dated Jan. 24, 2018, 11 pages.

Notice of Allowance for U.S. Appl. No. 14/998,085, dated Jul. 10, 2018, 11 pages.

European Search Report for European Patent Application No. 16879768.6, dated Aug. 20, 2019, 7 pages.

Malkowski et al., "3D Tree Cache — A Novel Approach to Non-Uniform Access Latency Cache Architectures for 3D CMPs," The Pennsylvania State University, Department of Computer Science and Engineering, Dec. 21, 2009, 15 pages.

* cited by examiner

NON-UNIFORM MEMORY ACCESS LATENCY ADAPTATIONS TO ACHIEVE BANDWIDTH QUALITY OF SERVICE

CROSS-REFERENCE TO RELATED APPLICATIONS

The present application claims the benefit of priority to U.S. Non-Provisional patent application Ser. No. 14/998,085 filed on Dec. 24, 2015.

TECHNICAL FIELD

Embodiments generally relate to memory structures. More particularly, embodiments relate to non-uniform memory access latency adaptations to achieve bandwidth quality of service.

BACKGROUND

Recent developments in memory technology may have resulted in the emergence of more advanced memory structures to supplement and/or replace traditional dynamic random access memory (DRAM). Accordingly, a given memory architecture in a computing system might include many different memory pools, with each pool having a different access latency, bandwidth and/or other properties. Multiple computing cores may access the various memory pools through a shared buffer that has a finite number of entries. Due to the non-uniform memory access (NUMA) latencies of the memory pools, requests to access higher latency pools may dominate the shared buffer over time. For example, if Pool A is relatively "fast" and has lower access latencies (e.g., 50 ns) and Pool B is relatively "slow" and has higher access latencies (e.g., 500 ns), requests to access Pool A might be serviced ten times faster than requests to access Pool B, on average. As the Pool A access requests are quickly serviced and removed from the shared buffer, they may be replaced with slower requests for Pool B. In such a case, the shared buffer may ultimately fill up with requests to access Pool B. Accordingly, the process(es) generating the Pool A requests may experience a negative impact on quality of service (QoS) and/or performance.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Recent developments in memory architectures may provide for non-volatile memory (NVM) that is used to store volatile data considered to be stored in a volatile memory. For example, such volatile data may include, for example, data used by an application or operating system, that the application or operating system considers to be stored in a volatile memory and is no longer stored in the volatile memory after a system reset. Examples of NVM may include, for example, block addressable memory device, such as NAND or NOR technologies, phase change memory (PCM), three dimensional cross point memory, or other byte addressable nonvolatile memory devices, memory devices that use chalcogenide phase change material (e.g., chalcogenide glass), resistive memory, nanowire memory, ferroelectric transistor random access memory (FeTRAM), flash memory such as solid state disk (SSD) NAND or NOR, multi-threshold level NAND flash memory, NOR flash memory, magnetoresistive random access memory (MRAM) memory that incorporates memristor technology, spin transfer torque (STT)-MRAM, or a combination of any of the above, or other memory. These memory structures may be particularly useful in datacenter environments such as, for example, high performance computing (HPC) systems, big data systems and other architectures involving relatively high bandwidth data transfers.

Figure 1:
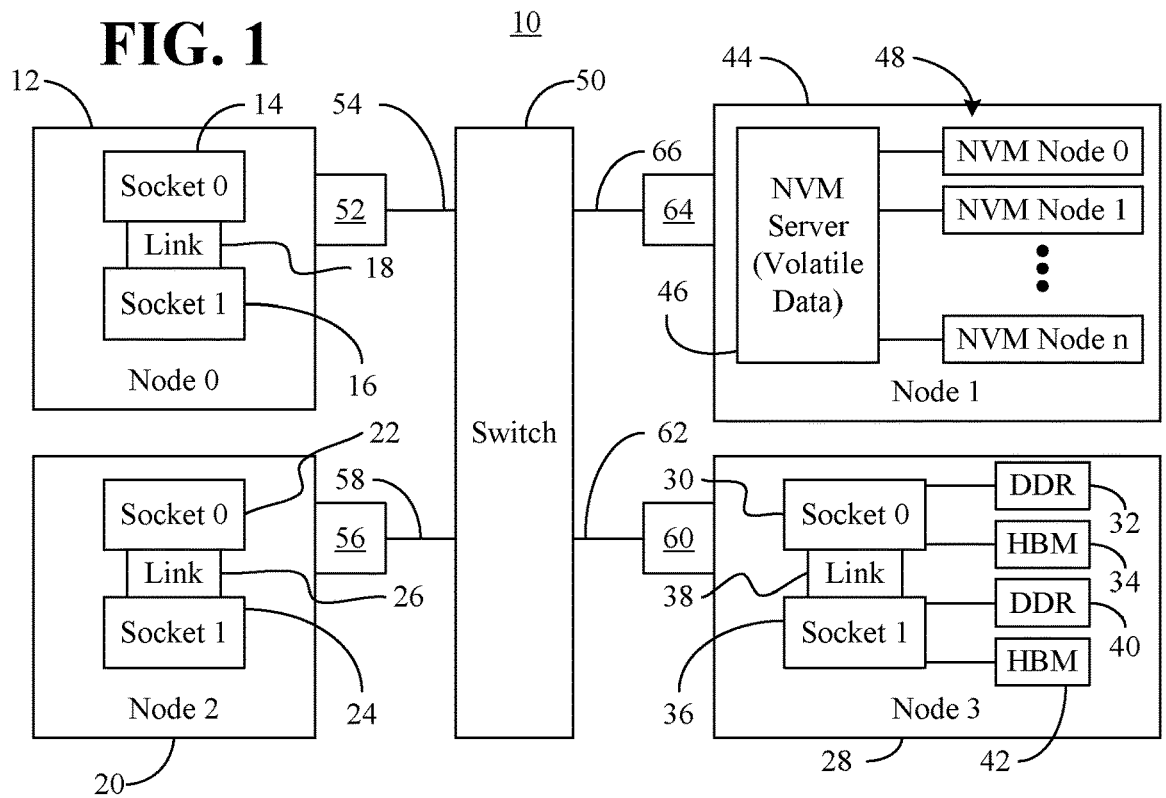
FIG. 1 is a block diagram of an example of a computing system according to an embodiment.

Turning now to FIG. 1, a latency-aware computing system 10 is shown in which a memory architecture includes a plurality of domains (e.g., pools, levels) that are associated with non-uniform access latencies. The computing system 10 may generally be part of an electronic device/platform having computing functionality (e.g., datacenter, server, personal digital assistant/PDA, notebook computer, tablet computer), communications functionality (e.g., smart phone), imaging functionality, media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, a node 12 ("Node 0") includes a socket 14 ("Socket 0", e.g., including a semiconductor die/chip with a host processor, multiple cores and one or more cache agents, not shown) that is communicatively coupled to a socket 16 ("Socket 1", e.g., including a semiconductor die/chip with a host processor, multiple cores and one or more cache agents, not shown) via a native link 18 (e.g., Unified Path Interconnect/UPI).

Similarly, a node 20 ("Node 2") might include a socket 22 ("Socket 0", e.g., including a semiconductor die/chip with a host processor, multiple cores and one or more cache agents, not shown) that is communicatively coupled to a socket 24 ("Socket 1", e.g., including a semiconductor die/chip with a host processor, multiple cores and one or more cache agents, not shown) via a native link 26 (e.g., UPI). Each of the sockets 14, 16, 22, 24 may be coupled to local memory such as volatile memory, for example. In this regard, the cache agent(s) of the nodes 12, 20 may each use a shared queue such as, for example, a buffer, super queue (SQ), table of requests (TOR), etc., to manage local (e.g., on-die) requests to access both local and remote memory in the computing system 10.

Examples volatile memory include dynamic volatile memory includes DRAM (dynamic random access memory), or some variant such as synchronous DRAM (SDRAM).

A memory subsystem as described herein may be compatible with a number of memory technologies, such as DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WIO2

(Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (LPDDR version 5, currently in discussion by JEDEC), HBM2 (HBM version 2, currently in discussion by JEDEC), and/or others, and technologies based on derivatives or extensions of such specifications.

For example, a node 28 ("Node 3") may include a socket 30 ("Socket 0", e.g., including a semiconductor die/chip with a host processor, multiple cores and one or more cache agents, not shown) that is communicatively coupled to a DDR standard compatible memory 32 and an HBM standard compatible memory 34. The illustrated socket 30 is also communicatively coupled to a socket 36 ("Socket 1", e.g., including a semiconductor die/chip with a host processor, multiple cores and one or more cache agents, not shown) via a native link 38 (e.g., UPI). The socket 36 may in turn be locally coupled to a DDR memory 40 and a high bandwidth memory 42.

Moreover, another node 44 ("Node 1") may include an NVM server 46 that is configured to store volatile data, wherein the illustrated NVM server 46 is coupled to a plurality of NVM nodes 48 (e.g., "NVM Node 0" to "NVM Node n"). The node 12 may be communicatively coupled to a switch 50 via an interface 52 (e.g., host fabric interface/HFI) and a link 54. Similarly, the node 20 may be communicatively coupled to the switch 50 via an interface 56 (e.g., HFI) and a link 58, the node 28 may be communicatively coupled to the switch 50 via an interface 60 (e.g., HFI) and a link 62, and the node 44 may be communicatively coupled to the switch 50 via an interface 64 (e.g., HFI) and a link 66. The memory architecture of the illustrated system 10 may be considered a non-uniform memory access (NUMA) architecture to the extent that the different domains may be accessed at different speeds depending on the location of the core requesting access and the location of the memory being accessed.

For example, the cores of the socket 30 in the node 28 may observe and/or encounter at least four different latency domains: (1) the local DDR memory 32; (2) the local high bandwidth memory 34; (3) the memory exposed by the socket 36; and (4) the memory exposed by the NVM server 46 on the node 44, the memory exposed by the node 12, and the memory exposed by the node 20. Each of the latency domains encountered by the socket 30 may be considered "homes" that exhibit different behavior in terms of latencies and the performance impact of retrieving data (e.g., cache lines) from the domains. Indeed, performance may be impacted by coherency management (e.g., snoops) in addition to remote access latency. As will be discussed in greater detail, the adaptive cache agents may conduct load balancing and fairness operations to control the rate at which requests are issued to the different latency domains by threads running on the cores. Accordingly, requests by the threads running on the socket 30 to access the DDR memory 32 may not experience a degradation in QoS or performance due to a shared queue in the socket 30 being dominated and/or overrepresented by local requests to access, for example, the NVM nodes 48.

Figure 2:
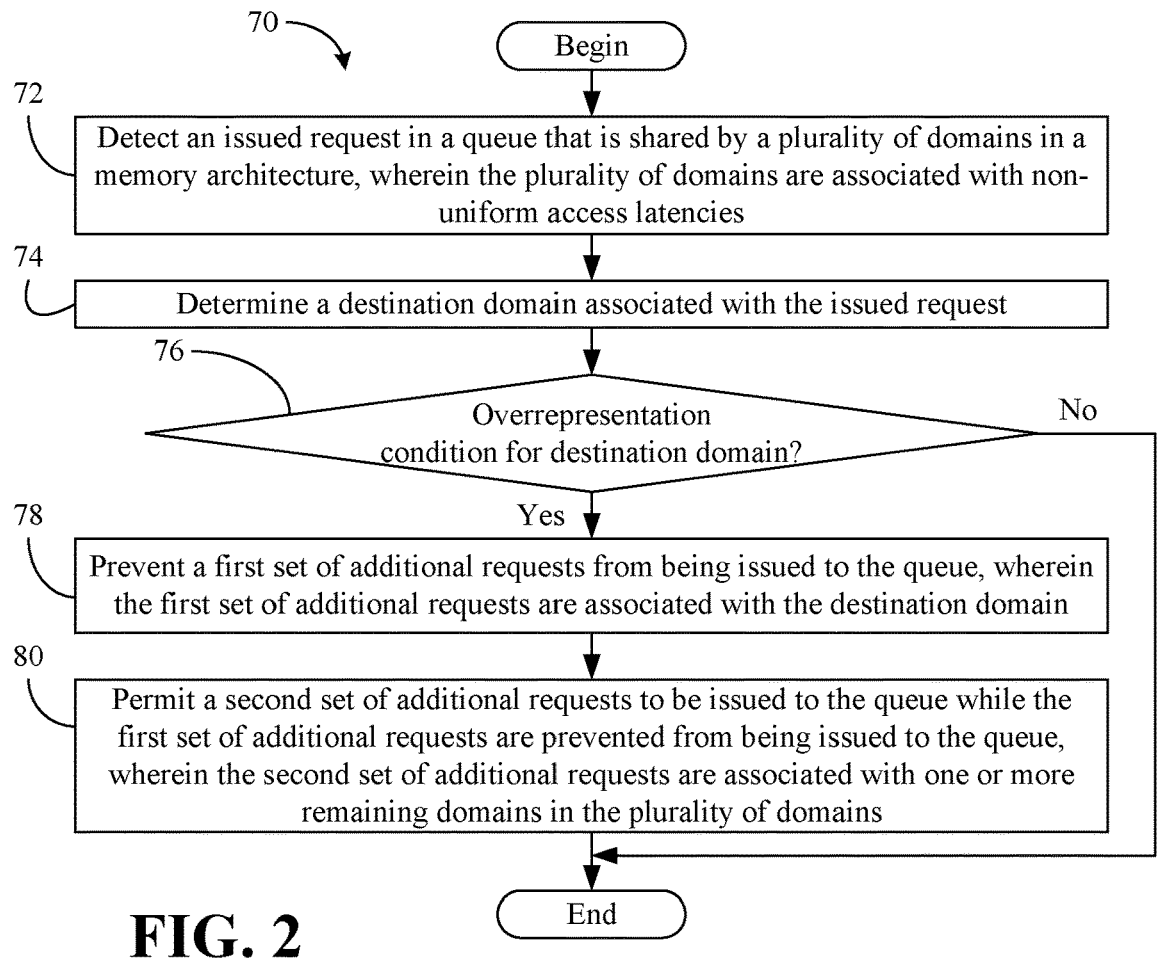
FIG. 2 is a flowchart of an example of a method of operating a cache agent apparatus according to an embodiment.

FIG. 2 shows a method 70 of operating an adaptive cache agent apparatus. The method 70 may generally be implemented in a computing system node such as, for example, one or more of the nodes 12, 20, 28, 44 (FIG. 1), already discussed. More particularly, the method 70 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 70 may be written in any combination of one or more programming languages, including an object oriented programming language such as JAVA, SMALLTALK, C++ or the like and conventional procedural programming languages, such as the "C" programming language or similar programming languages.

Illustrated processing block 72 provides for detecting an issued request in a queue that is shared by a plurality of domains in a memory architecture. Aggregated requests from the plurality of domains result in non-uniform access latencies to a memory system. A destination domain associated with the issued request may be determined at block 74. Block 74 may including applying a set of system address decoder (SAD) rules (e.g., decoders configured using pre-compiled code/p-code) to the issued request according to a certain order of priority. The most appropriate decoder rule may correspond to the destination (e.g., home) latency domain/pool/level for the issued request. In this regard, the decoders may automatically identify the memory level as, for example, an integer value (e.g., 0 to N, with 0 being the fastest access latency and N being the slowest latency), in addition to the target node, address range and other decoder fields. The memory level address definitions may be stored to any suitable memory location (e.g., DRAM address space, memory mapped input output/MMIO address space, and so forth).

Block 76 may determine whether an overrepresentation condition is satisfied with respect to the destination domain. Block 76 may generally include identifying the destination domain (e.g., based on a decode result indicating the associated destination domain), sending the decode result to the core that originated the issued request, and determining whether the destination domain has reached a certain balancing or fairness threshold relative to the other latency domains. For example, if a shared queue holds a maximum of twelve entries, with each of four different latency domains being allocated three entries, block 76 might determine whether the shared queue contains three requests to access the destination domain. If so, illustrated block 78 prevents a first set of additional requests from being issued to the queue, wherein the first set of additional requests are also associated with the destination domain.

As will be discussed in greater detail, block 78 may include enforcing, in a core, a credit policy with respect to the destination domain. Thus, the core might predict that the first set of additional requests are associated with the destination domain and use the prediction to enforce the credit policy. Block 78 may also include sending a throttling signal to a core, wherein the throttling signal indicates the overrepresentation condition (e.g., "there is no remaining space in the queue for the destination domain"). Moreover, illustrated block 80 permits a second set of additional requests to be issued to the queue while the first set of additional requests are prevented from being issued to the queue, wherein the second set of additional requests are associated with one or more remaining domains in the plurality of domains.

Figure 3:
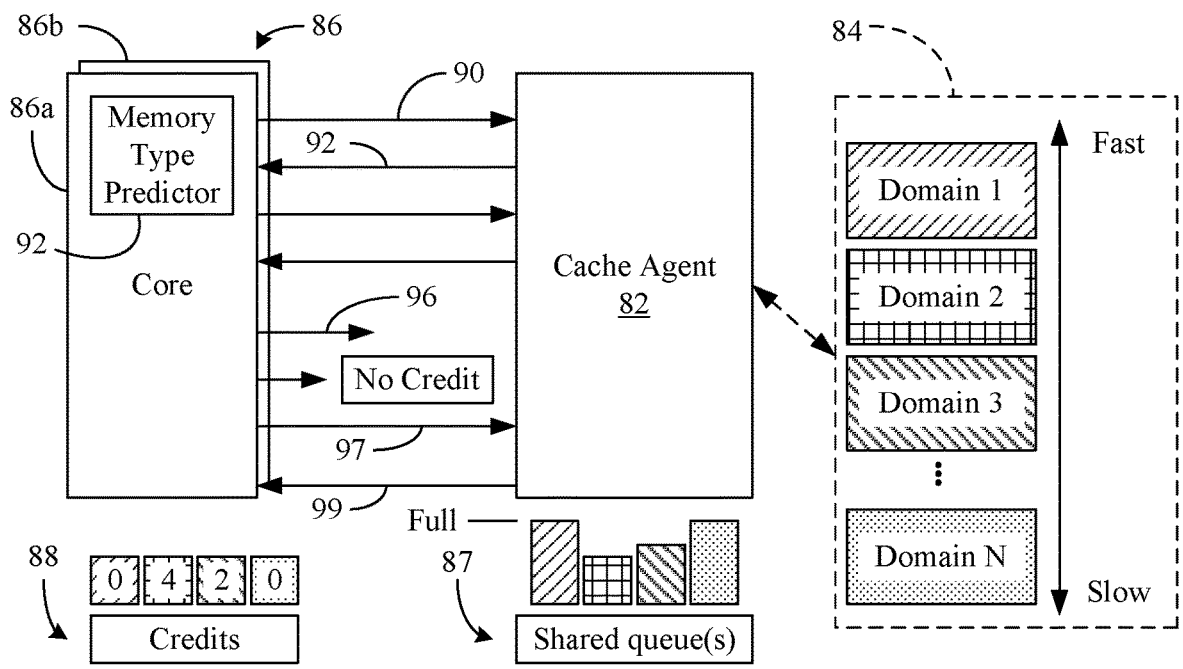
FIG. 3 is a block diagram of an example of a credit policy enforcement scenario according to an embodiment.

FIG. 3 shows an example in which a cache agent 82 is communicatively coupled to a memory architecture 84 including a plurality of latency domains ("Domain 1" to "Domain N") and a plurality of cores 86 (86a, 86b) that are configured to enforce a credit policy 88 with respect to each of the latency domains. The credit policy 88 may be programmable. In the illustrated example, the memory architecture 84 shares a queue 87 and a first core 86a sends a first request 90 to the cache agent 82, which may reside on the same semiconductor die as the first core 86a, but in a different location on the die (e.g., in an uncore region). An SAD may also be located near the cache agent 82 in the uncore region. The first core 86a may use a memory type predictor 92 to predict a destination domain in the memory architecture 84 for the first request 90. In this regard, the predictor 92 may maintain a prediction table that contains, on a per latency domain and per cache agent basis, the last address range accessed. An example prediction table is shown below in Table I.

TABLE I

| Cache Agent ID | Latency Domain | Last Accessed Range | Granularity Mask |
|---|---|---|---|
| 0 | 0 | 120000000 | 040000000 |
| 0 | 1 | 700000000 | 100000000 |
| ... | ... | ... | ... |
| M | N | F80000000 | 040000000 |

In the illustrated example, the size of the range is fixed per domain and specified using a bit mask, wherein the granularity may be configurable per domain. Thus, assuming a granularity of, for example, 4 GB for the Domain 1, the last address (e.g., 0x78C9657FA) sent to cache agent zero and targeting Domain 1 belongs to the address range [0x700000000,0x 700000000+4 GB]. Accordingly, in order to predict the domain of a request targeting address @X and cache agent (e.g., "CAm" in the expression below), the table would be accessed as a content addressable memory structure by applying the "&" operation with the corresponding mask and @X:

PredictedDomain=(DomainPredictionTable[CAm] [@X& granularity mask domain])

If PredictedDomain is NULL (meaning none of the domains matched), then PredictedDomain may be automatically assigned the value zero (e.g., assuming zero corresponds to the fastest and/or closest domain). Simply put, applications accessing a latency domain may operate within a certain range of addresses in that domain. By appropriately specifying the granularity, it is possible to achieve an intelligent and accurate prediction of the destination domain associated with access requests such as the first request 90. The benefit of such a prediction scheme is that it may potentially yield high hit rates and may be implemented using a content addressable memory (CAM) structure that provides results within a few cycles.

The first core 86a may also determine whether the predicted destination domain complies with the credit policy 88 and, if so, speculatively deduct from the credits allocated to the predicted destination domain. Thus, if the first request 90 is predicted to access illustrated Domain 3, the first core 86a might deduct a single credit from the current credits available for Domain 3. The first request 90 may therefore include the request payload as well as the predicted destination domain. Upon receipt of the first request 90, the cache agent 82 may use an SAD to determine the actual destination domain associated with the first request 90. If the prediction is correct, the cache agent 82 may return an acknowledgement 92 (ACK) including the requested data, a state message (e.g., go to) and the actual destination domain. Once the first request 90 is complete, the first core 86a may update the prediction table and the credit policy 88 (e.g., incrementing the Domain 3 credit). If, on the other hand, the prediction is incorrect, the cache agent 82 may return a non-acknowledgement (NACK) along with an indication of the correct destination domain. In such a case, the first core 86a may update the prediction table and resubmit the first request 90.

The first core 86a may also predict that a second request 96 is associated with a destination domain that has no remaining credits (e.g., Domain 1 or Domain N in the illustrated example). In such a case, the first core 86 may enforce the credit policy 88 by blocking or otherwise withholding the second request 96. A third request 97, however, might be associated with a remaining domain such as, for example, Domain 2 or Domain 3. In such a case, the first core 86a may issue the third request 97 to the cache agent 82 and receive an ACK 99 from the cache agent 82.

Figure 4:
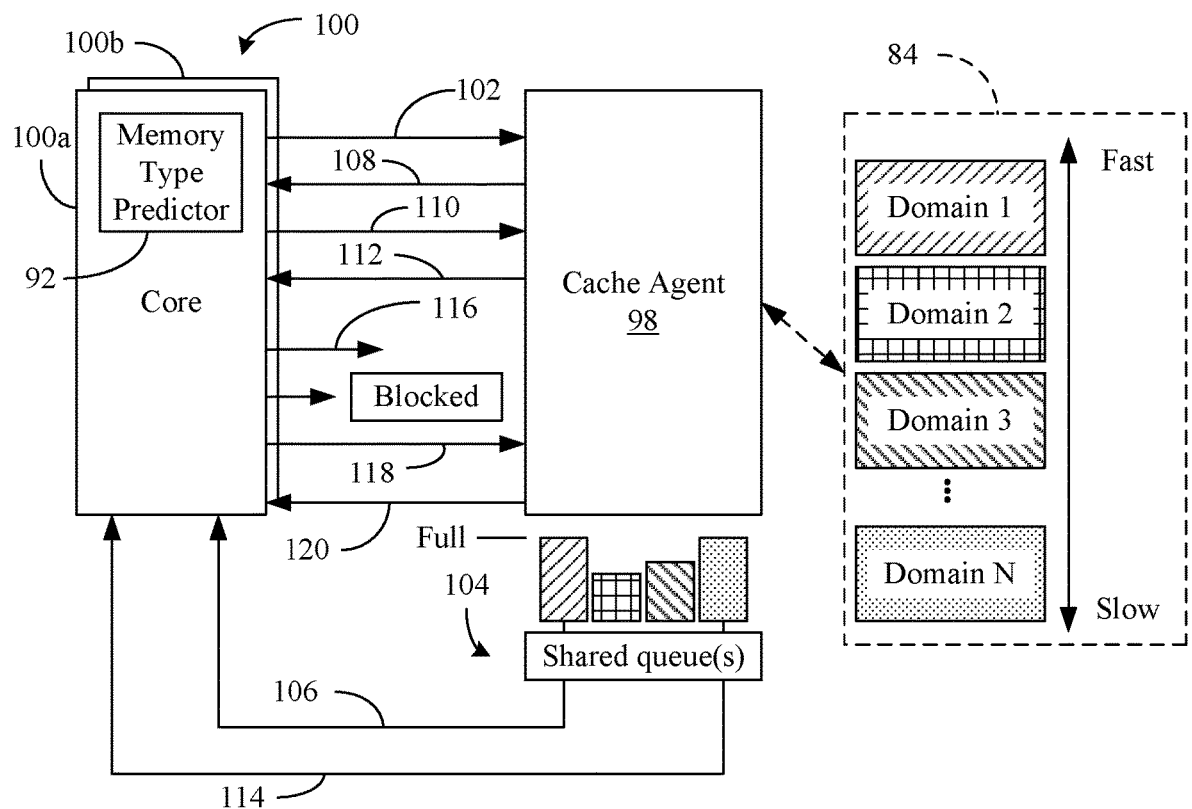
FIG. 4 is a block diagram of an example of a throttling scenario according to an embodiment.

Turning now to FIG. 4, an example is shown in which a cache agent 98 is communicatively coupled to the memory architecture 84 and a plurality of cores 100 (100a, 100b) that are configured to respond to programmable throttling signals issued by the cache agent 98. In the illustrated example, the memory architecture 84 shares a queue 104 and a first core 100a sends a first request 102 to the cache agent 98. More particularly, if the cache agent 98 determines that an overrepresentation condition has occurred because the first request 102 is associated with, for example, Domain 1, and the Domain 1 allocation of the shared queue 104 is full, the cache agent 98 may return an ACK 108 and generate a throttling signal 106. Similarly, a second request 110 to access, for example, Domain N might cause the cache agent 98 to return an ACK 112 and generate a throttling signal 114. Accordingly, if a subsequent request 116 to access Domain 1 is encountered in the first core 100a, the throttling signal 106 may cause the core 100a to block the subsequent request 116 and prevent it from being issued to the shared queue 104. Another request 118, however, to access Domain 2 may still be issued to the cache agent 98 because the cache agent 98 has not generated a throttling signal for Domain 2. In such a case, the cache agent 98 may generate an ACK 120 in response to successful servicing and/or completion of the other request 120.

Figure 5:
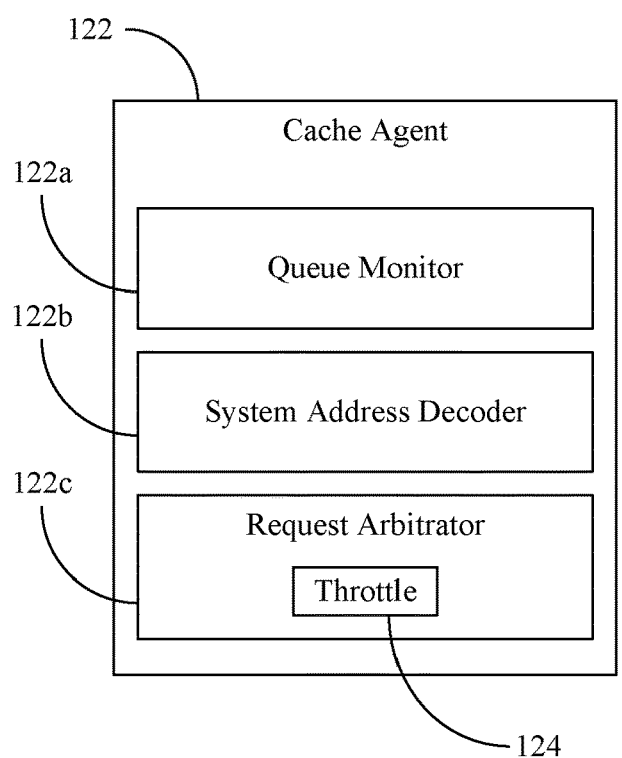
FIG. 5 is a block diagram of an example of a cache agent according to an embodiment.

Turning now to FIG. 5, a cache agent apparatus 122 (122a-122c) is shown. The apparatus 122, which may include logic instructions, configurable logic, fixed functionality logic hardware, etc., or any combination thereof, may generally implement one or more aspects of the method 70 (FIG. 2), already discussed. In one example, the apparatus 122 may be readily substituted for the cache agent 82 (FIG. 3) and/or the cache agent 98 (FIG. 4). More particularly, the illustrated cache agent apparatus 122 includes a queue monitor 122a to detect an issued request in a queue that is shared by a plurality of domains in a memory architecture, wherein the plurality of domains are associated with non-uniform access latencies. Additionally, a system address decoder 122b may determine a destination domain associated with the issued request.

The illustrated apparatus 122 also includes a request arbitrator 122c to prevent a first set of additional requests from being issued to the queue if the issued request satisfies an overrepresentation condition with respect to the destination domain and the first set of additional requests are associated with the destination domain. The request arbitrator 122c may also permit a second set of additional requests to be issued to the queue while the first set of additional requests are prevented from being issued to the queue, wherein the second set of additional requests are associated with one or more remaining domains in the plurality of domains.

In one example, the request arbitrator 122c includes a throttle component 124 to send a throttling signal to a core, wherein the throttling signal indicates the overrepresentation condition. Alternatively, a core might enforce a credit policy with respect to the destination domain to prevent the first set of additional requests from being issued. Additionally, the system address decoder 122b may send a decode result to a core that originated the issued request, wherein the decode result indicates that the issued request is associated with the destination domain.

Figure 6:
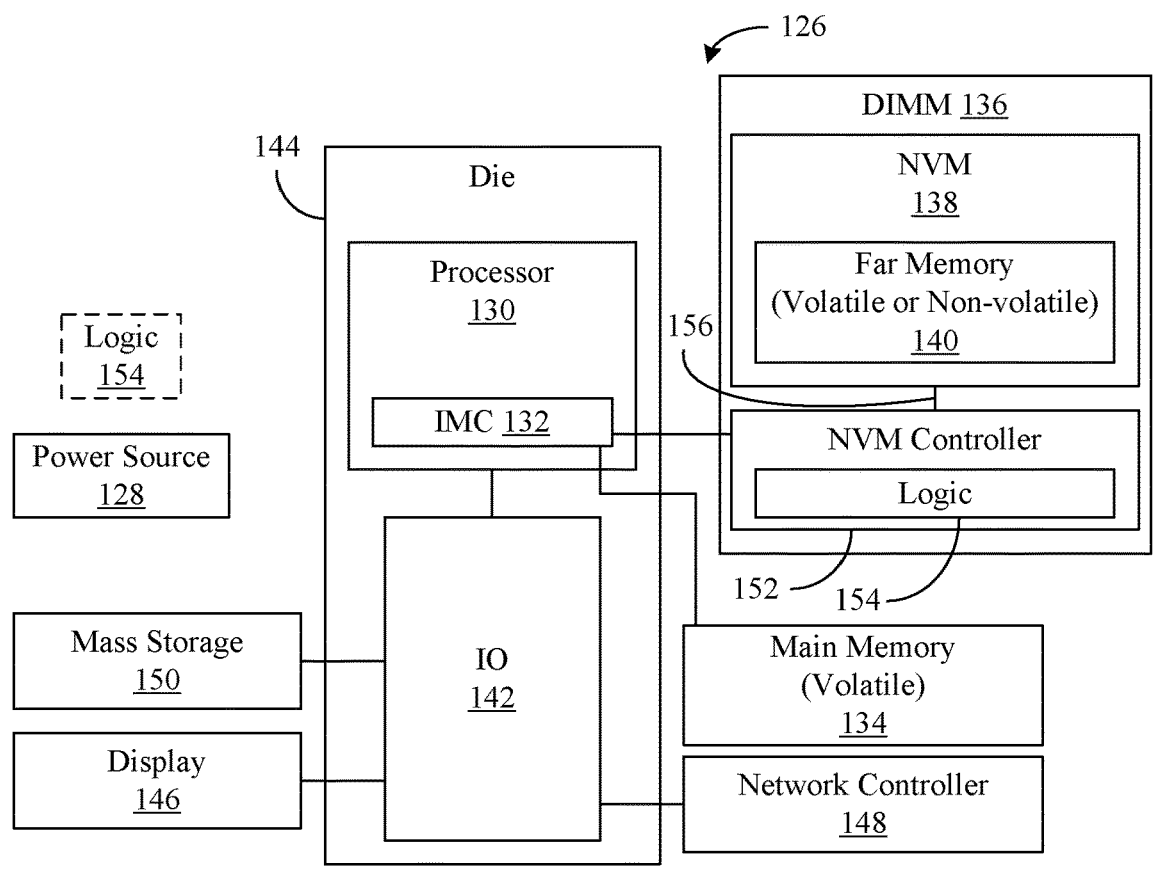
FIG. 6 is a block diagram of an example of a latency-aware computing system according to an embodiment.

FIG. 6 shows latency-aware computing system 126. The computing system 126 may generally be part of an electronic device/platform having computing functionality (e.g., datacenter, server, personal digital assistant/PDA, notebook computer, tablet computer), communications functionality (e.g., smart phone), imaging functionality, media playing functionality (e.g., smart television/TV), wearable functionality (e.g., watch, eyewear, headwear, footwear, jewelry), vehicular functionality (e.g., car, truck, motorcycle), etc., or any combination thereof. In the illustrated example, the system 126 includes a power source 128 to supply power to the system 126 and a processor 130 having an integrated memory controller (IMC) 132 that is coupled to main memory 134 (e.g., volatile "near" memory). The IMC 132 may also be coupled to another memory module 136 (e.g., dual inline memory module/DIMM) containing a non-volatile memory structure such as, for example, NVM 138. The NVM 138 may include "far" memory 140, which may also be used to store volatile data. Thus, the far memory 140 and the main memory 134 may function as a two-level memory (2LM) structure, wherein the main memory 134 generally serves as a low-latency and high-bandwidth cache of the far memory 140.

The NVM 138 may include any of the examples of non-volatile memory devices listed earlier. As already noted, the memory module 136 may include volatile memory, for example, DRAM configured as one or more memory modules such as, for example, DIMMs, small outline DIMMs (SODIMMs), etc. Examples volatile memory include dynamic volatile memory includes DRAM (dynamic random access memory), or some variant such as synchronous DRAM (SDRAM).

A memory subsystem as described herein may be compatible with a number of memory technologies, such as DDR4 (DDR version 4, initial specification published in September 2012 by JEDEC), LPDDR4 (LOW POWER DOUBLE DATA RATE (LPDDR) version 4, JESD209-4, originally published by JEDEC in August 2014), WIO2 (Wide I/O 2 (WideIO2), JESD229-2, originally published by JEDEC in August 2014), HBM (HIGH BANDWIDTH MEMORY DRAM, JESD235, originally published by JEDEC in October 2013), DDR5 (DDR version 5, currently in discussion by JEDEC), LPDDR5 (LPDDR version 5, currently in discussion by JEDEC), HBM2 (HBM version 2, currently in discussion by JEDEC), and/or others, and technologies based on derivatives or extensions of such specifications.

The illustrated system 126 also includes an input output (10) module 142 implemented together with the processor 130 on a semiconductor die 144 as a system on chip (SoC), wherein the IO module 142 functions as a host device and may communicate with, for example, a display 146 (e.g., touch screen, liquid crystal display/LCD, light emitting diode/LED display), a network controller 148, and mass storage 150 (e.g., hard disk drive/HDD, optical disk, flash memory, etc.). The memory module 136 may include an NVM controller 152 having logic 154 that is connected to the far memory 140 via an internal bus 156 or other suitable interface. The illustrated logic 154 may implement one or more aspects of the method 70 (FIG. 2), already discussed. The logic 154 may alternatively be implemented elsewhere in the system 80.

Additional Notes and Examples

Example 1 may include a latency-aware computing system comprising a memory architecture including a plurality of domains, at least two of the domains comprising different associated memory access latencies, a switch interconnecting two or more of the plurality of domains, a queue that is shared by the plurality of domains, a queue monitor to detect an issued request in the queue, a system address decoder to determine a destination domain associated with the issued request, and a request arbitrator to prevent a first set of additional requests from being issued to the queue if the issued request satisfies an overrepresentation condition with respect to the destination domain and the first set of additional requests are associated with the destination domain.

Example 2 may include the system of Example 1, wherein the request arbitrator is to permit a second set of additional requests to be issued to the queue while the first set of additional requests are prevented from being issued to the queue, and wherein the second set of additional requests are associated with one or more remaining domains in the plurality of domains.

Example 3 may include the system of Example 1, further including a core to enforce a credit policy with respect to the destination domain to prevent the first set of additional requests from being issued.

Example 4 may include the system of Example 1, further including a throttle component to send a throttling signal to a core, wherein the throttling signal indicates the overrepresentation condition.

Example 5 may include the system of Example 1, wherein the system address decoder is to send a decode result to a core that originated the issued request, and wherein the decode result indicates that the issued request is associated with the destination domain.

Example 6 may include the system of any one of Examples 1 to 5, further including one or more cores to predict that the first set of additional requests are associated with the destination domain.

Example 7 may include the system of claim 1, further comprising one or more of a processor communicatively coupled to the memory architecture, a display communicatively coupled to the memory architecture; a network interface communicatively coupled to a processor; or a battery communicatively coupled to a processor.

Example 8 may include a cache agent apparatus comprising a queue monitor to detect an issued request in a queue that is shared by a plurality of domains in a memory architecture, wherein at least two of the domains comprise different associated memory access latencies, a system address decoder to determine a destination domain associated with the issued request, and a request arbitrator to prevent a first set of additional requests from being issued from the queue if the issued request satisfies an overrepresentation condition with respect to the destination domain and the first set of additional requests are associated with the destination domain.

Example 9 may include the apparatus of Example 8, wherein the request arbitrator is to permit a second set of additional requests to be issued to the queue while the first set of additional requests are prevented from being issued to the queue, and wherein the second set of additional requests are associated with one or more remaining domains in the plurality of domains.

Example 10 may include the apparatus of Example 8, further including a core to enforce a credit policy with respect to the destination domain to prevent the first set of additional requests from being issued.

Example 11 may include the apparatus of Example 8, further including a throttle component to send a throttling signal to a core, wherein the throttling signal indicates the overrepresentation condition.

Example 12 may include the apparatus of Example 8, wherein the system address decoder is to send a decode result to a core that originated the issued request, and wherein the decode result indicates that the issued request is associated with the destination domain.

Example 13 may include the apparatus of any one of Examples 8 to 12, further including one or more cores to predict that the first set of additional requests are associated with the destination domain.

Example 14 may include a method of operating a cache agent apparatus comprising detecting an issued request in a queue that is shared by a plurality of domains in a memory architecture, wherein at least two of the domains comprise different associated memory access latencies, determining a destination domain associated with the issued request, and preventing a first set of additional requests from being issued to the queue if the issued request satisfies an overrepresentation condition with respect to the destination domain and the first set of additional requests are associated with the destination domain.

Example 15 may include the method of Example 14, further including permitting a second set of additional requests to be issued to the queue while the first set of additional requests are prevented from being issued to the queue, wherein the second set of additional requests are associated with one or more remaining domains in the plurality of domains.

Example 16 may include the method of Example 14, wherein preventing the first set of additional requests from being issued includes enforcing, in a core, a credit policy with respect to the destination domain.

Example 17 may include the method of Example 14, wherein preventing the first set of additional requests from being issued includes sending a throttling signal to a core, wherein the throttling signal indicates the overrepresentation condition.

Example 18 may include the method of Example 14, further including sending a decode result to a core that originated the issued request, wherein the decode result indicates that the issued request is associated with the destination domain.

Example 19 may include the method of any one of Examples 14 to 18, further including predicting, in one or more cores, that the first set of additional requests are associated with the destination domain.

Example 20 may include at least one computer readable storage medium comprising a set of instructions, which when executed by a computing device, causes the computing device to detect an issued request in a queue that is shared by a plurality of domains in a memory architecture, wherein at least two of the domains comprise different associated memory access latencies, determine a destination domain associated with the issued request, and prevent a first set of additional requests from being issued to the queue if the issued request satisfies an overrepresentation condition with respect to the destination domain and the first set of additional requests are associated with the destination domain.

Example 21 may include the at least one computer readable storage medium of Example 20, wherein the instructions, when executed, cause a computing device to permit a second set of additional requests to be issued to the queue while the first set of additional requests are prevented from being issued to the queue, and wherein the second set of additional requests are associated with one or more remaining domains in the plurality of domains.

Example 22 may include the at least one computer readable storage medium of Example 20, wherein the instructions, when executed, cause a computing device to enforce, in a core, a credit policy with respect to the destination domain to prevent the first set of additional requests from being issued.

Example 23 may include the at least one computer readable storage medium of Example 20, wherein the instructions, when executed, cause a computing device to send a throttling signal to a core, and wherein the throttling signal indicates the overrepresentation condition.

Example 24 may include the at least one computer readable storage medium of Example 20, wherein the instructions, when executed, cause a computing device to send a decode result to a core that originated the issued request, and wherein the decode result indicates that the issued request is associated with the destination domain.

Example 25 may include the at least one computer readable storage medium of any one of Examples 20 to 24, wherein the instructions, when executed, cause a computing device to predict, in one or more cores, that the first set of additional requests are associated with the destination domain.

Example 26 may include a cache agent apparatus comprising means for detecting an issued request in a queue that is shared by a plurality of domains in a memory architecture, wherein at least two of the domains comprise different associated memory access latencies, means for determining a destination domain associated with the issued request, and means for preventing a first set of additional requests from being issued to the queue if the issued request satisfies an overrepresentation condition with respect to the destination domain and the first set of additional requests are associated with the destination domain.

Example 27 may include the apparatus of Example 26, further including means for permitting a second set of additional requests to be issued to the queue while the first set of additional requests are prevented from being issued to the queue, wherein the second set of additional requests are associated with one or more remaining domains in the plurality of domains.

Example 28 may include the apparatus of Example 26, wherein the means for preventing the first set of additional requests from being issued includes means for enforcing, in a core, a credit policy with respect to the destination domain.

Example 29 may include the apparatus of Example 26, wherein the means for preventing the first set of additional requests from being issued includes means for sending a throttling signal to a core, wherein the throttling signal indicates the overrepresentation condition.

Example 30 may include the apparatus of Example 26, further including means for sending a decode result to a core that originated the issued request, wherein the decode result indicates that the issued request is associated with the destination domain.

Example 31 may include the apparatus of any one of Examples 26 to 30, further including means for predicting, in one or more cores, that the first set of additional requests are associated with the destination domain.

Techniques described herein may therefore provide new hardware and software interfaces that enable fair and flexible provisioning of memory bandwidth in multi-NUMA systems. Accordingly, successful adoption may be made of emerging memory technologies and fabric technologies that provide access to remote memories via memory semantics. Moreover, techniques may enable avoidance of performance degradations related to bandwidth throttling.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A system comprising: a queue that is shared by a plurality of domains of a memory architecture, wherein at least two of the domains comprise different associated memory access latencies, wherein the plurality of domains is to represent different memories of the memory architecture;
   a queue monitor to detect a first issued request in the queue;
   a system address decoder to determine a first destination domain associated with the first issued request, wherein the first destination domain is one of the plurality of domains;
   a request arbitrator to prevent a first set of additional requests from being issued to the queue if the first issued request satisfies an overrepresentation condition with respect to the first destination domain and the first set of additional requests are associated with the first destination domain, wherein the request arbitrator is to assign an allocated number of requests to each domain of the plurality of domains, and identify that the first issued request satisfies the overrepresentation condition in response to a determination that the first issued request has caused a total number of issued requests associated with the first destination domain to reach the allocated number of requests for the first destination domain; and
   a core that is to:
      originate a second request;
      conduct a prediction that the first destination domain is to be associated with the second request based on an address range associated with the second request, wherein the prediction bypasses a definitive determination of an actual domain of the plurality of domains that is associated with the second request; and
      based on the prediction, enforce a credit policy with respect to the first destination domain to prevent the second request from being issued to the queue in response to the overrepresentation condition of the first destination domain being satisfied by the first issued request.

2. The system of claim 1, wherein the core is to originate a third issued request that is to include a predicted destination domain, and wherein the system address decoder is to:
   determine a second destination domain associated with the third issued request, wherein the second destination domain is another of the plurality of domains; and
   determine whether the predicted destination domain is the same as the second destination domain.

3. The system of claim 2, wherein the system address decoder is to:
   determine that the predicted destination domain is not the same as the second destination domain; and send a non-acknowledgement to the core, wherein the non-acknowledgement is to include an indication that the third issued request is associated with the second destination domain.

4. The system of claim 3, wherein core is to:
receive the non-acknowledgement;
update a prediction table based on the non-acknowledgement to reflect the second destination domain;
access the updated prediction table to predict destination domains for access requests; and
submit a modified third issued request that includes the second destination domain.

5. The system of claim 2, wherein the system address decoder is to:
determine that the predicted destination domain is the same as the second destination domain; and
send an acknowledgement to the core, wherein the acknowledgement is to include requested data associated with the third issued request, a state message and the second destination domain.

6. The system of claim 1, wherein the queue, the queue monitor, the system address decoder and the request arbitrator are on a same die.

7. An apparatus comprising: a queue monitor to detect a first issued request in a queue that is shared by a plurality of domains of a memory architecture, wherein at least two of the domains comprise different associated memory access latencies, wherein the plurality of domains is to represent different memories of the memory architecture;
a system address decoder to determine a first destination domain associated with the first issued request, wherein the first destination domain is one of the plurality of domains;
a request arbitrator to prevent a first set of additional requests from being issued to the queue if the first issued request satisfies an overrepresentation condition with respect to the first destination domain and the first set of additional requests are associated with the first destination domain, wherein the request arbitrator is to assign an allocated number of requests to each domain of the plurality of domains, and identify that the first issued request satisfies the overrepresentation condition in response to a determination that the first issued request has caused a total number of issued requests associated with the first destination domain to reach the allocated number of requests for the first destination domain; and
a core that is to:
originate a second request;
conduct a prediction that the first destination domain is to be associated with the second request based on an address range associated with the second request, wherein the prediction bypasses a definitive determination of an actual domain of the plurality of domains that is associated with the second request; and
based on the prediction, enforce a credit policy with respect to the first destination domain to prevent the second request from being issued to the queue in response to the overrepresentation condition of the first destination domain being satisfied by the first issued request.

8. The apparatus of claim 7, wherein the core is to originate a third issued request that is to include a predicted destination domain, and wherein the system address decoder is to:
determine a second destination domain associated with the third issued request, wherein the second destination domain is another of the plurality of domains; and
determine whether the predicted destination domain is the same as the second destination domain.

9. The apparatus of claim 8, wherein the system address decoder is to:
determine that the predicted destination domain is not the same as the second destination domain; and
send a non-acknowledgement to the core, wherein the non-acknowledgement is to include an indication that the third issued request is associated with the second destination domain.

10. The apparatus of claim 9, wherein core is to:
receive the non-acknowledgement;
update a prediction table based on the non-acknowledgement to reflect the second destination domain;
access the updated prediction table to predict destination domains for access requests; and
submit a modified third issued request that includes the second destination domain.

11. The apparatus of claim 8, wherein the system address decoder is to:
determine that the predicted destination domain is the same as the second destination domain; and
send an acknowledgement to the core, wherein the acknowledgement is to include requested data associated with the third issued request, a state message and the second destination domain.

12. The apparatus of claim 7, wherein the queue monitor, the system address decoder and the request arbitrator are on a same die.

13. A method comprising:
detecting a first issued request in a queue that is shared by a plurality of domains of a memory architecture, wherein at least two of the domains comprise different associated memory access latencies, wherein the plurality of domains represents different memories of the memory architecture;
determining a first destination domain associated with the first issued request, wherein the first destination domain is one of the plurality of domains;
assigning an allocated number of requests to each domain of the plurality of domains;
identifying that an overrepresentation condition is satisfied in response to a determination that the first issued request has caused a total number of issued requests associated with the first destination domain to reach the allocated number of requests for the first destination domain;
preventing a first set of additional requests from being issued to the queue when the first issued request satisfies the overrepresentation condition with respect to the first destination domain and the first set of additional requests are associated with the first destination domain;
originating, with a core, a second request;
conducting a prediction, with the core, that the first destination domain is associated with the second request based on an address range associated with the second request, wherein the prediction bypasses a definitive determination of an actual domain of the plurality of domains that is associated with the second request; and
based on the prediction, enforcing, with the core, a credit policy with respect to the first destination domain to prevent the second request from being issued to the queue in response to the overrepresentation condition of the first destination domain being satisfied by the first issued request.

14. The method of claim 13, further comprising:
originating, from the core, a third issued request that is to include a predicted destination domain;
determining a second destination domain associated with the third issued request, wherein the second destination domain is another of the plurality of domains; and
determining whether the predicted destination domain is the same as the second destination domain.

15. The method of claim 14, further comprising:
determining that the predicted destination domain is not the same as the second destination domain; and
sending a non-acknowledgement to the core, wherein the non-acknowledgement is to include an indication that the third issued request is associated with the second destination domain.

16. The method of claim 15, further comprising:
receiving, with the core, the non-acknowledgement;
updating, with the core, a prediction table based on the non-acknowledgement to reflect the second destination domain;
accessing, with the core, the updated prediction table to predict destination domains for access requests; and
submitting, with the core, a modified second third issued request that includes the second destination domain.

17. The method of claim 14, further comprising:
determining that the predicted destination domain is the same as the second destination domain; and
sending an acknowledgement to the core, wherein the acknowledgement is to include requested data associated with the third issued request, a state message and the second destination domain.

18. At least one non-transitory computer readable storage medium comprising a set of instructions, which when executed by a computing device, cause a computing device to:
detect a first issued request in a queue that is shared by a plurality of domains of a memory architecture, wherein at least two of the domains comprise different associated memory access latencies, wherein the plurality of domains is to represent different memories of the memory architecture;
determine a first destination domain associated with the first issued request, wherein the first destination domain is one of the plurality of domains;
assign an allocated number of requests to each domain of the plurality of domains;
identify that an overrepresentation condition is satisfied in response to a determination that the first issued request has caused a total number of issued requests associated with the first destination domain to reach the allocated number of requests for the first destination domain;
prevent a first set of additional requests from being issued to the queue when the first issued request satisfies the overrepresentation condition with respect to the first destination domain and the first set of additional requests are associated with the first destination domain;
originate, with a core, a second request;
conducting a prediction, with the core, that the first destination domain is associated with the second request based on an address range associated with the second request, wherein the prediction bypasses a definitive determination of an actual domain of the plurality of domains that is associated with the second request; and
based on the prediction, enforcing, with the core, a credit policy with respect to the first destination domain to prevent the second request from being issued to the queue in response to the overrepresentation condition of the first destination domain being satisfied by the first issued request.

19. The at least one non-transitory computer readable storage medium of claim 18, wherein the instructions, when executed, cause a computing device to:
originate, with the core, a third issued request that is to include a predicted destination domain;
determine a second destination domain associated with the third issued request, wherein the second destination domain is another of the plurality of domains; and
determine whether the predicted destination domain is the same as the second destination domain.

20. The at least one non-transitory computer readable storage medium of claim 19, wherein the instructions, when executed, cause a computing device to:
determine that the predicted destination domain is not the same as the second destination domain; and
send a non-acknowledgement to the core, wherein the non-acknowledgement is to include an indication that the third issued request is associated with the second destination domain.

21. The at least one non-transitory computer readable storage medium of claim 20, wherein the instructions, when executed, cause a computing device to:
receive, with the core, the non-acknowledgement;
update, with the core, a prediction table based on the non-acknowledgement to reflect the second destination domain;
access, with the core, the updated prediction table to predict destination domains for access requests; and
submit, with the core, a modified third issued request that includes the second destination domain.

22. The at least one non-transitory computer readable storage medium of claim 19, wherein the instructions, when executed, cause a computing device to:
determine that the predicted destination domain is the same as the second destination domain; and
send an acknowledgement to the core, wherein the acknowledgement is to include requested data associated with the third issued request, a state message and the second destination domain.

* * * * *